United States Patent [19]
Coulis et al.

[11] Patent Number: 5,661,939
[45] Date of Patent: Sep. 2, 1997

[54] INTERLOCKING PANEL AND METHOD OF MAKING THE SAME

[75] Inventors: Mark Lawrence Coulis, Brunswick; Jack Thomas Mowery, Medina, both of Ohio

[73] Assignee: Associated Materials Incorporated, Akron, Ohio

[21] Appl. No.: 442,310

[22] Filed: May 16, 1995

[51] Int. Cl.⁶ .................................................. E04D 1/00
[52] U.S. Cl. .................... 52/519; 52/520; 52/540; 52/543; 52/745.19
[58] Field of Search ............................. 52/518, 519, 520, 52/521, 528, 535, 536, 537, 538, 539, 540, 543, 545, 546, 745.19

[56]  References Cited

U.S. PATENT DOCUMENTS

| | | | |
|---|---|---|---|
| 1,410,299 | 3/1922 | Harshberger | 52/518 X |
| 3,430,395 | 3/1969 | Lashkow | 52/528 |
| 3,552,078 | 1/1971 | Mattes | 52/520 |
| 4,096,011 | 6/1978 | Sanders et al. . | |
| 4,134,244 | 1/1979 | Sjölander . | |
| 4,669,238 | 6/1987 | Kellis et al. . | |
| 4,788,088 | 11/1988 | Kohl . | |
| 4,930,287 | 6/1990 | Volk et al. . | |
| 4,947,609 | 8/1990 | Champagne | 52/520 X |
| 5,224,318 | 7/1993 | Kemerer . | |
| 5,241,785 | 9/1993 | Meyer . | |
| 5,363,623 | 11/1994 | King | 52/520 |
| 5,461,839 | 10/1995 | Beck | 52/519 |
| 5,465,543 | 11/1995 | Seifert | 52/545 X |

*Primary Examiner*—Wynn E. Wood
*Assistant Examiner*—Aimee E. McTigue
*Attorney, Agent, or Firm*—Banner & Witcoff, Ltd.

[57]  ABSTRACT

A plastic siding panel which includes an upper connector, a medial main portion, and a lower connector. The connectors are complementary in shape so that they interlock with other siding panels of like construction. At least one of the connectors include a strip of high strength material for rigidifying the siding panel. The siding panels are fabricated by extruding a monolithic, substantially planar sheet composed of three different materials. Two of the materials are formed as layers which extend over the entire sheet. The third material is a high strength material adapted to rigidify the siding panel. After extrusion, the sheet is formed into a siding panel having a main portion, an upper connection and a lower connection.

22 Claims, 8 Drawing Sheets

INTERLOCKING PANEL AND METHOD OF MAKING THE SAME

FIELD OF THE INVENTION

The present invention pertains to plastic interlocking panels and the process by which they are fabricated. In particular, the panels are primarily intended for use as siding for installation on buildings, homes and other structures.

BACKGROUND OF THE INVENTION

Siding composed of vinyl or other plastic material is a common medium for use as an external covering of a structure. Such siding is fabricated as elongate panels having connectors formed along the lengths of the upper and lower edges. In use, the siding panels are placed in horizontal interlocking tiers.

Figure 1:
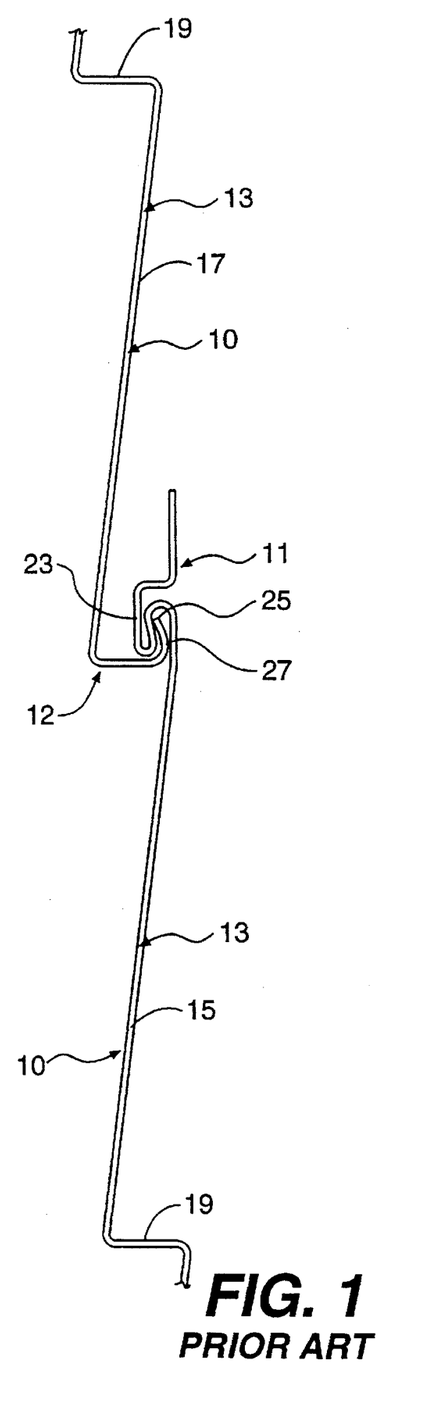
FIG. 1 is a partial end view of a pair of interlocked prior art siding panels.

In one common construction, the siding panels use Pittsburgh or hurricane locks to interlock the panels (FIG. 1). Since the two panels of FIG. 1 are identical, the same reference numerals are used for both panels. A conventional siding panel 10 includes an upper connector 11, a lower connector 12, and a medial body 13. Body 13 ordinarily has a pair of faces 15, 17 separated by a center butt 19. Upper connector 11 is bent to form a dogleg protrusion 23 which extends downwardly over the upper face 15 of the siding panel to form a groove 25. Lower connector 12 has a channel-like shape. The distal wall 27 of the lower connector is inclined back toward the lower face 17 of the body. Distal wall 27 is snugly fit within groove 25 to interlock adjacent siding panels.

A premium siding panel will frequently be formed by a pair of materials fused together. The outer layer or capstock is composed of a weather, wear and impact resistant material which also provides a good appearance. The underlayer or substrate is composed of a stiffer material to increase the strength of the panel. Even with this composite construction, though, siding panels have suffered from a lack of sufficient stiffness. As a result, plastic siding has been difficult to install and unsuitable for certain areas of the country (e.g. coastal areas with high winds).

In an effort to improve the rigidity of plastic siding, the connectors of some panels have been altered to receive a fiberglass rod. More specifically, the connectors are formed to have circular channel shapes and define a modified Pittsburgh lock. Fiberglass rods are placed in the openings defined by the circular connectors. However, a full length panel (e.g., 12' 1") has virtually no increase in stiffness because of slippage between the rods and the panels along shear planes. As a result, the modified construction has not provided the desired benefits.

SUMMARY OF THE INVENTION

The present invention pertains to interlocking, plastic panels and a method by which they are fabricated. The panel has an upper connector, a medial main portion, and a lower connector. The connectors are complementary in shape so that they interlock with other panels of like construction. A strip of high strength material is fixed to at least one of the connectors or other panel portion for rigidifying the panel. The greater rigidity enables easier installation of the panels in an interlocked manner. The panels of the present invention can even be installed by one person. Moreover, the present invention provides a stronger overall construction which permits the use of the panels as siding in coastal areas and other environments for which plastic siding has previously been deemed unsuitable.

The method of the present invention is practiced by extruding a monolithic, substantially planar sheet composed of three different materials. Two of the materials are formed as layers which extend over the entire sheet. These two layers define opposite sides of the sheet. The third material is a high strength material which is fixed to the sheet to rigidify the panel. After extrusion, the sheet is formed into a panel having a main portion, an upper connect and a lower connector.

DETAILED DESCRIPTION OF THE PREFERRED EMBODIMENTS

The present invention pertains to interlocking panels composed of vinyl or other plastic materials. The panels are primarily intended for use as siding installed on buildings and other structures. The panels have a novel construction which enhances installation and strength of the siding structure.

Figure 2:
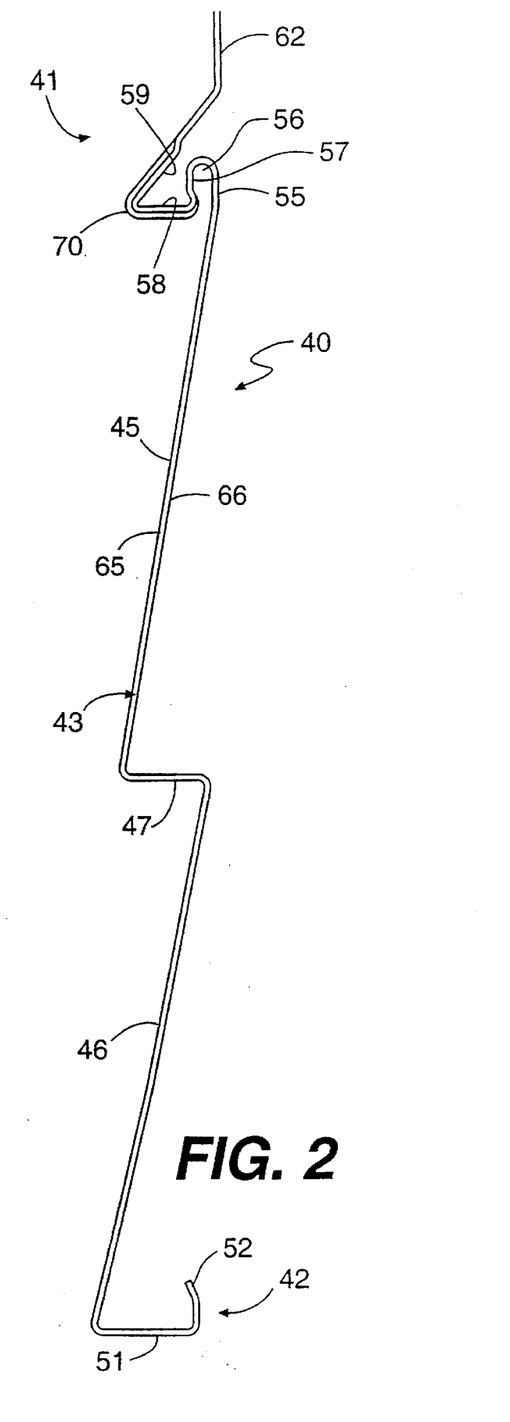
FIG. 2 is an end view of a panel in accordance with the present invention.
Figure 3:
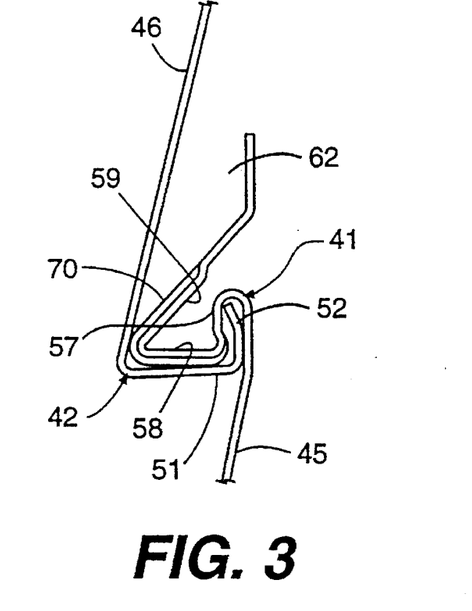
FIG. 3 is a partial end view of a pair of interlocked panels of the present invention.

In a preferred embodiment, a siding panel 40 (FIG. 2) in accordance with the present invention includes an upper connector portion 41, a lower connector portion 42, and a medial body or main portion 43. Main portion 43 can have a wide variety of configurations, but preferably includes a pair of vertical face sections 45, 46 separated by a center butt or ledge 47. The upper and lower connector portions 41, 42 can also have wide range of shapes. Nevertheless, connector portions 41, 42 have complimentary shapes so that siding panels can be interlocked (FIG. 3); that is, upper connector portion 41 interlocks with lower connector 42 of an adjacent siding panel 40. Since the panels of FIG. 3 are identical, the corresponding elements have been provided with the same reference numerals.

In one preferred embodiment (FIGS. 2 and 3), lower connector portion 42 has a conventional channel or trough shape which is defined by a generally L-shaped projection having a horizontal arm 51 and an upstanding arm 52 which bows inward slightly. Upper connector portion 41 also has a channel or trough shape which interlocks with connector portion 42. Connector portion 41 is defined by a first locking wall 57 which opposes the upper end 55 of face section 45 and defines a groove 56 which is adapted to receive and hold upstanding arm 52, as is known in the industry.

However, unlike conventional siding panels, the remaining portion of upper connector 41 has a broad construction which projects from the interlocked structures. In particular, a horizontal wall 58 extends forward from the distal end of locking wall 57, and an elongate inclined wall 59 extends upwardly and rearwardly from the remote end of wall 58. A nailing hem 62 projects upward from the upper end of inclined wall 59. Preferably walls 58, 59 extend across the entire width of the trough defined by lower connector 42. As discussed further below, walls 58, 59 are preferably relied upon to provide the enhanced stiffness of the siding panel.

As is common in the industry, siding panel 40 is composed of a pair of differently formulated plastic materials. Preferably, both of the materials are composed primarily of PVC resins. The capstock or exterior layer 65 is formulated to have a good appearance and to be weather, wear and impact resistant. The substrate or interior layer 66 is formulated primarily for stiffness and strength. Nevertheless, other constructions including only one material or more than two materials could be used to form layers of the siding panel.

Siding panel 40 also includes at least one strip 70 of a rigid, high strength material which is fixed to a side of the siding panel to greatly enhance its stiffness. The high strength material is preferably a compounded, reinforced PVC material. One such material preferred for use as the reinforcing high strength material is known as GEON Fiberloc 925 GR30 manufactured by GEON Corporation. Another alternative material is known as Tuf-Stif manufactured by Georgia Gulf Corporation. Other high strength materials including other plastics or materials (e.g., graphite or boron) may also be used.

The strip of high strength material can be provided in a number of different locations including the upper connector portion 41, the lower connector portion 42 and/or the center butt 47. Preferably, at least one strip of high strength material is fixed along the length of the upper connector 41. As shown in FIGS. 2 and 3, one preferred arrangement is to fix strip 70 along the outer surfaces of legs 58, 59. The lateral extension of legs 58, 59 and the placement of the strip on the outer surface of the connector portion 41 maximizes the material's ability to stiffen the siding panel.

At the location where strip 70 is applied, the capstock and substrate may maintain their full thicknesses or be reduced. In the construction illustrated in FIG. 2, strip 70 accounts for about 60 percent of the panel's thickness. The thickness of capstock 65 is reduced about 20 percent where the strip has been applied, but the thickness of the substrate 66 remains substantially unchanged. Wide variations in the thicknesses of the different materials, however, are within the scope of the invention.

Figure 3A:
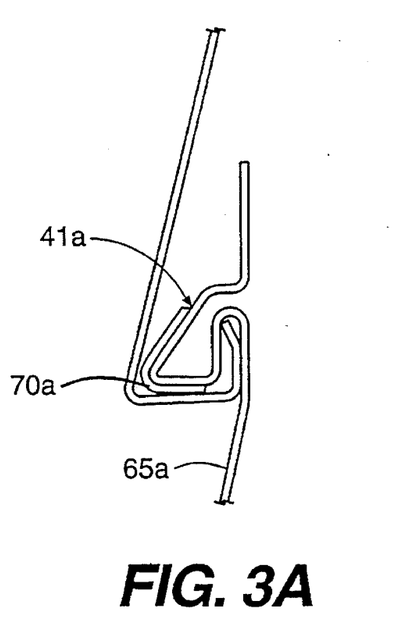
FIGS. 3A–3G are partial end views of a pair of interlocked panels of alternative embodiments of the present invention.
Figure 3B:
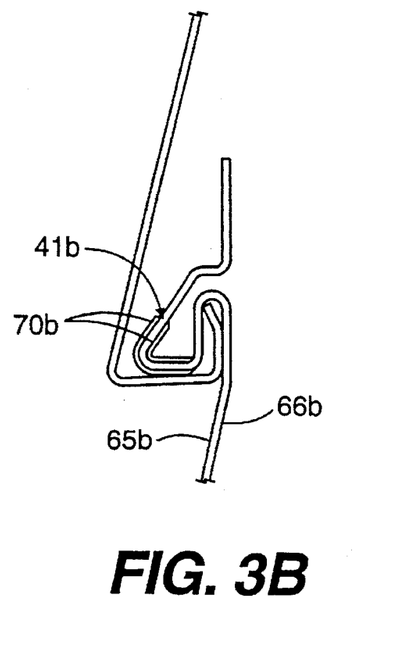
Figure 3C:
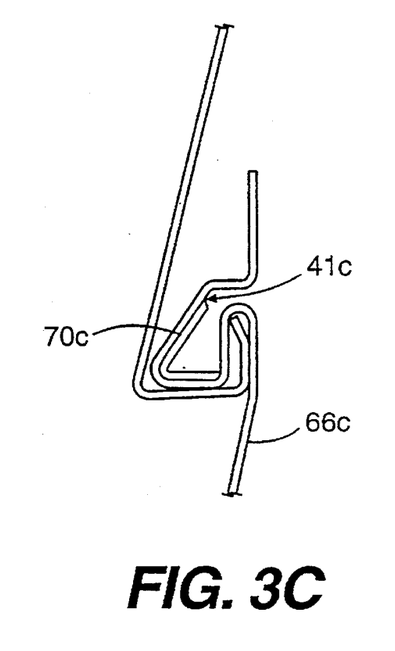

Alternatively, strip 70a can be applied along capstock 65a of upper connector portion 41a with no reduction of the capstock (FIG. 3A); strip 70b can be applied along both substrate 66b and capstock 65b of upper connector portion 41b (FIG. 3B); or strip 70c can be applied along the substrate 66c of upper connector portion 41c. In the preferred embodiment, the high strength material is applied to the capstock and the substrate of the upper connector portion. These strips 70a, 70b can have a variety of different thickness and be coupled with or without reductions in one or both of the capstock or substrate materials.

Figure 3D:
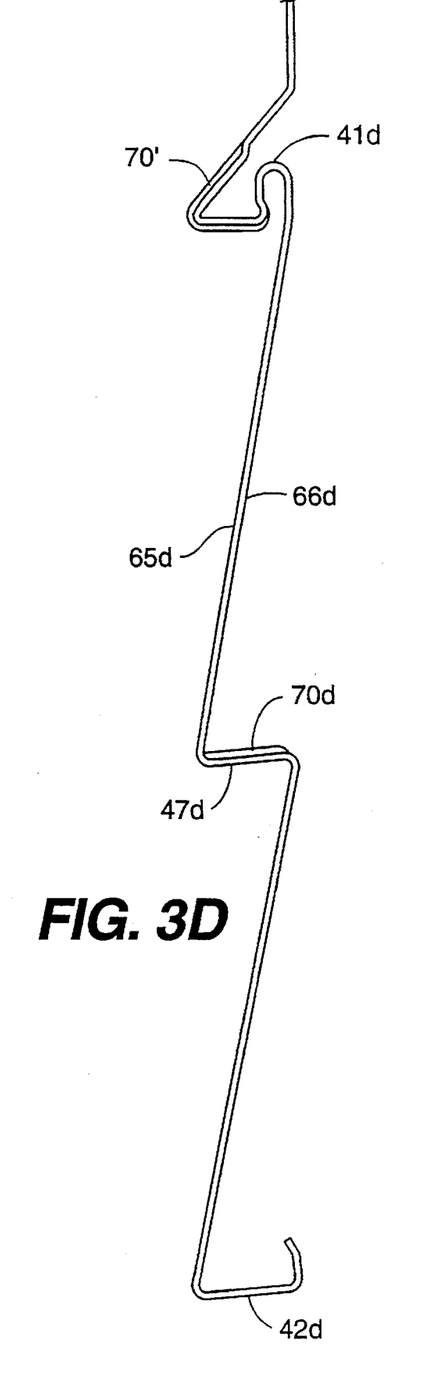
Figure 3E:
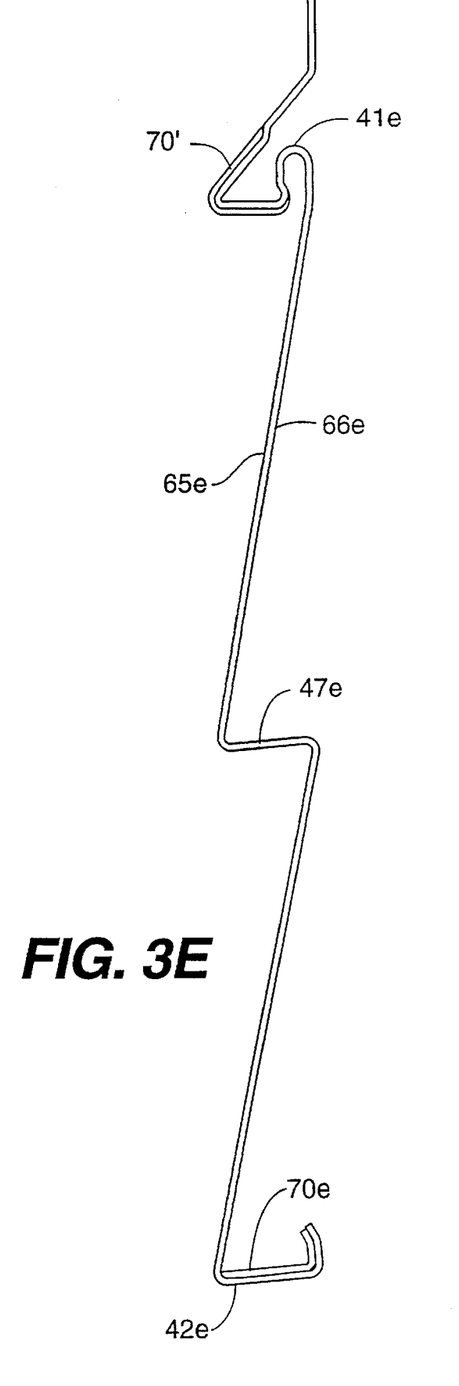

Strips of high strength material can also be applied along lower connector portion 42d (FIG. 3D) or center butt 47e (FIG. 3E). In these constructions, the strips 70d, 70e would preferably be located along the substrate 66d, 66e so that it remains hidden from view. However, if appearance is not a factor, the strips could be placed over the capstock 65d, 65e as well. These alternative strips can be used to supplement the strip 70' (or strips) along upper connector 41d, 41e or be used without such an upper connector strip.

Figure 3F:
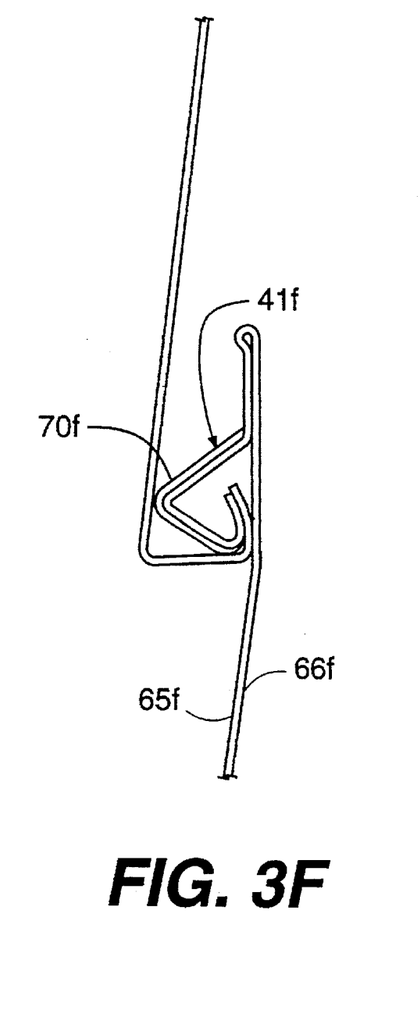
Figure 3G:
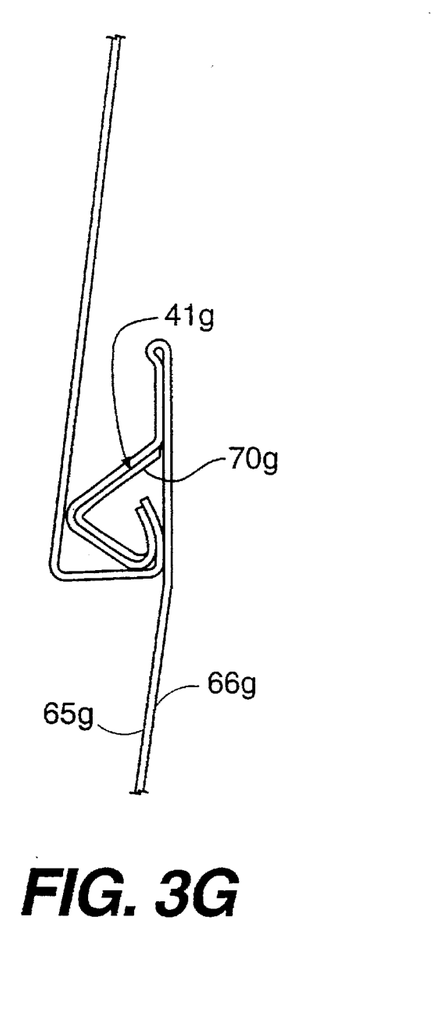

The structure of the connector portions can also be varied. As an example, FIGS. 3F and 3G illustrate an alternative panel having a differently configured upper connector portion 41f, 41g. Strips 70f, 70g of high strength material can again be applied to the capstock 65g (FIG. 3G) and/or substrate 66f (FIG. 3F) of the panel 40f, 40g. As with the earlier panels, strips 70f, 70g can have a variety of different thicknesses and be applied to portions of the panel having full or reduced capstock or substrate thicknesses.

Figure 4:
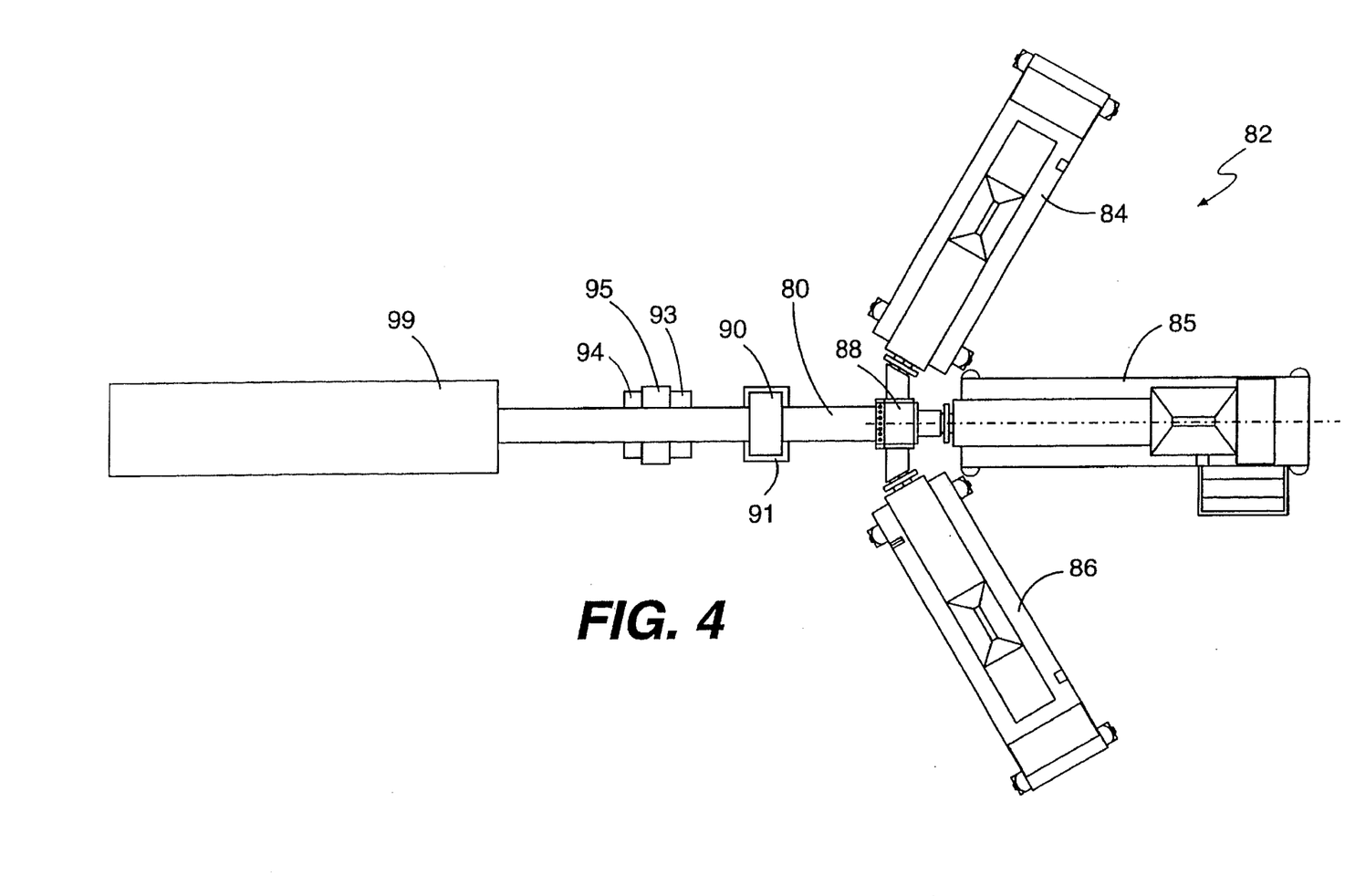
FIG. 4 is a top schematic view of a process for making a panel in accordance with the present invention.
Figure 5:
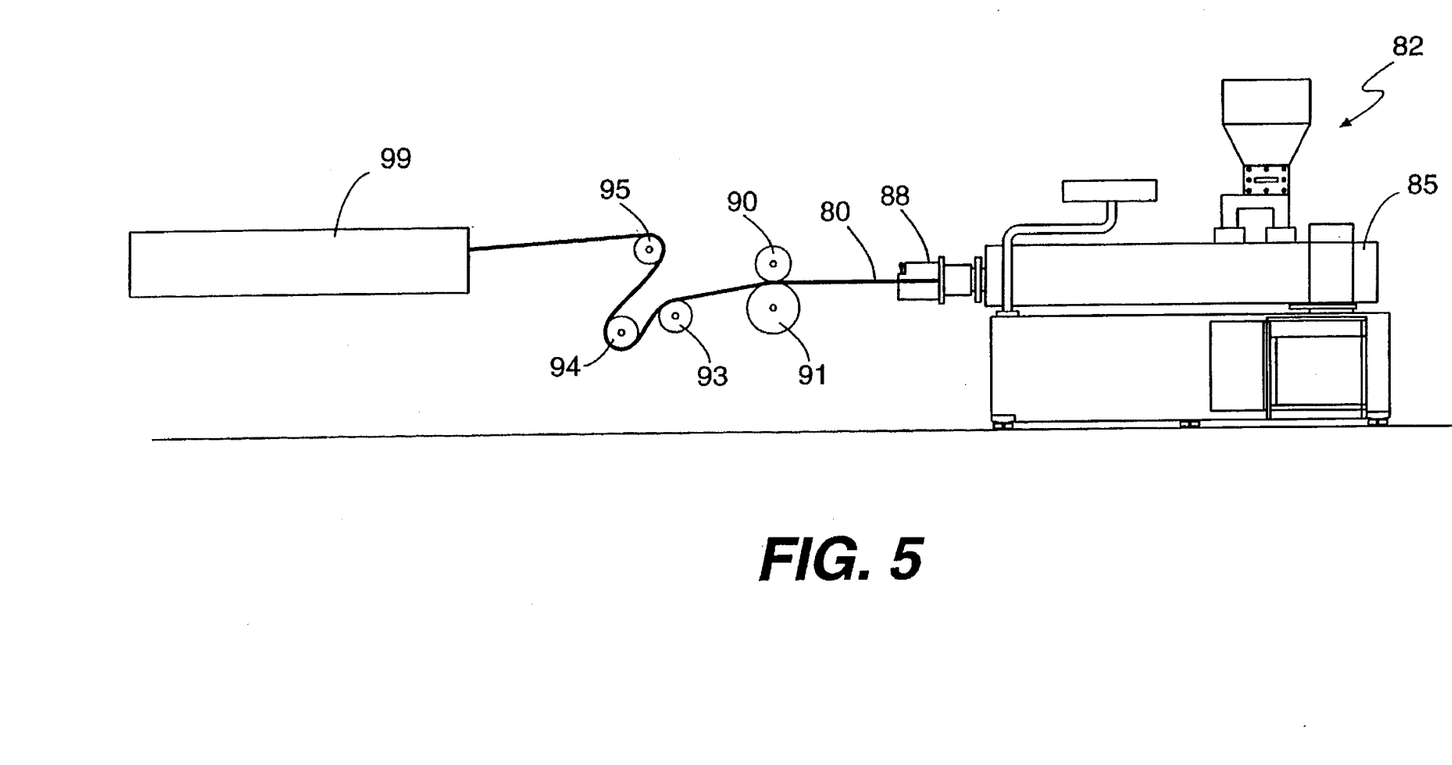
FIG. 5 is a side schematic view of the process for making a panel with the side extruders omitted for clarity.
Figure 6:
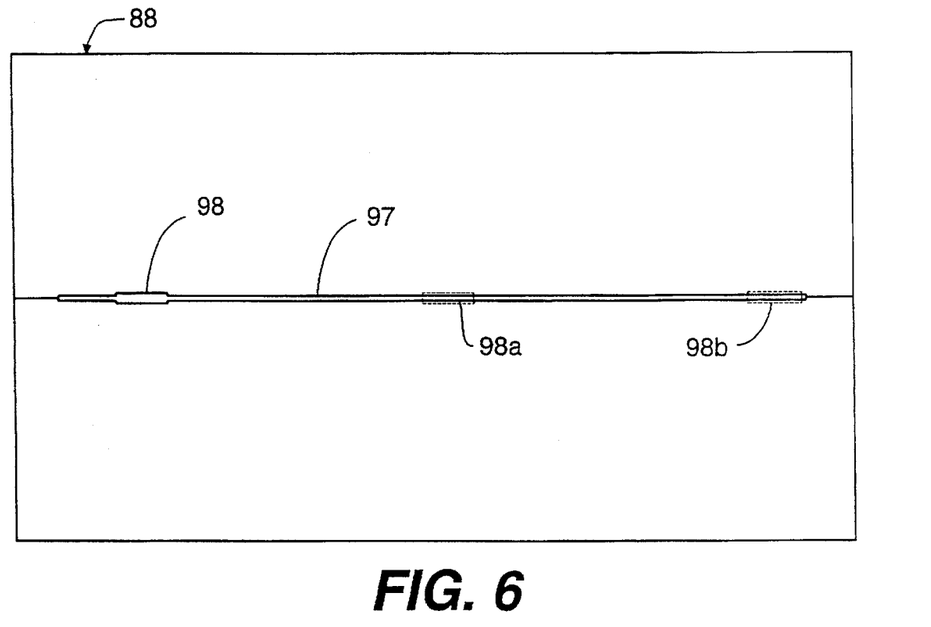
FIG. 6 is a diagrammatic front view of a die head used in the process for making a panel.
Figure 7:
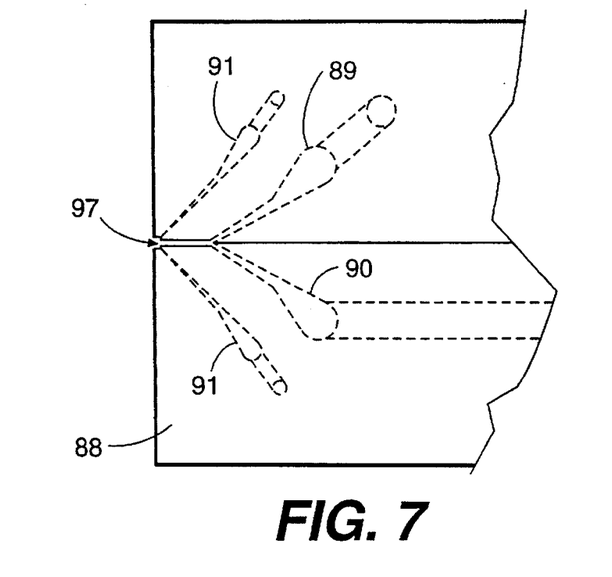
FIG. 7 is a diagrammatic side view of the die head.

Preferably, siding panels in accordance with the present invention are formed by a process involving extrusion and die forming. More specifically, a monolithic, planar sheet 80 is tri-extruded by an extruding apparatus 82 (FIGS. 4 and 5). The apparatus includes a first extruder 84 for the capstock material 65, a second extruder 85 for the substrate material 66, and a third extruder 86 for the high strength material. The three extruders feed into a tri-extruding die head 88. The head 88 includes feed passages which are oriented to properly position the material as desired (FIG. 7). Head 88 includes a feed passage 89 coupled to extruder 84, feed passage 90 coupled to extruder 85, and one or more feed passages 91 coupled to extruder 86. The head defines an elongate planar orifice 97 which directs the materials to form planar sheet 80. The enlarged segment 98 of the orifice accommodates the increased thickness caused by the application of strips of high strength material. While FIG. 7 illustrates a die head for applying strips 70b, other orifice configurations can also be used. Additional enlarged segments 98a, 98b may also be provided for applying strips to other parts of the panel.

Monolithic sheet 80 is formed with two complete layers of the capstock and substrate, and one or more strips of high strength material placed at the proper locations. As can be appreciated, the three materials are all fused to each other to prevent relative movement.

After the extrusion process, sheet 80 is passed through embossing rollers 90, 91, if desired, to apply a pattern (e.g., wood grain) to the capstock, followed by cooling rollers 93–95 (or other cooling means). Of course, the particular arrangement, existence and order of embossing and cooling rollers can be changed as needed for each particular process. The partially cooled sheet 80 is then fed into the post forming station 99 wherein the panel is successively folded, cooled and cut into its desired configuration by a series of cooperating die elements, cooling tanks and a cutter (not shown).

Figure 8:
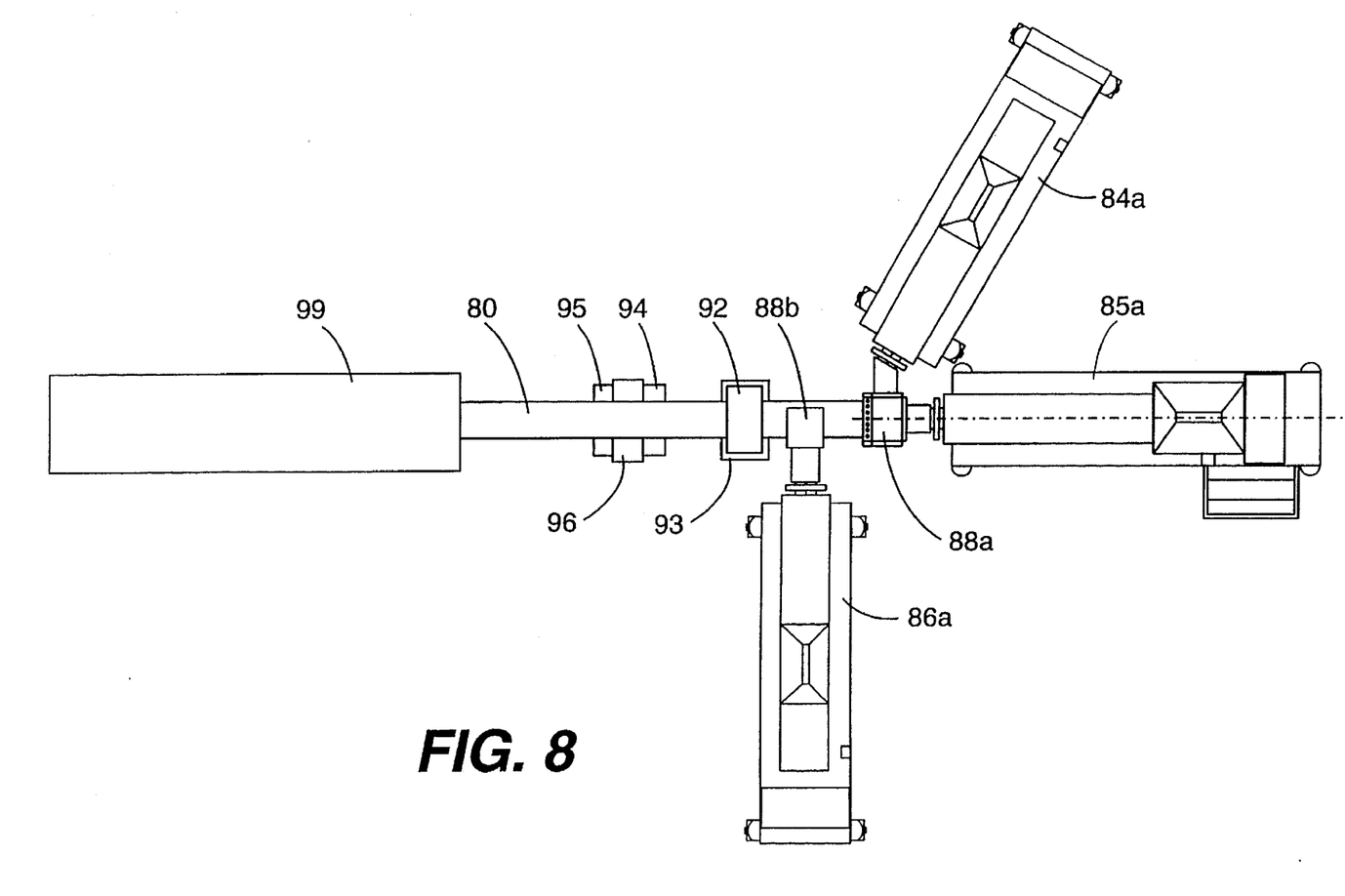
FIG. 8 is a top schematic view of an alternative process for making a panel in accordance with the present invention.

As an alternative, the capstock and substrate layers may first be co-extruded by extruders 84a, 85a as a monolithic sheet 80a from die head 88a (FIG. 8). Thereafter, the third extruder 86a applies via die head 88b at least one strip of the high strength material so that the strip is fused to one of the other two materials. The following steps of embossing, cooling and forming would be the same.

The above discussion concerns the preferred embodiments of the present invention. Various other embodiments as well as many changes and alterations may be made without departing from the spirit and broader aspects of the invention as defined in the claims.

We claim:

1. A plastic panel comprising a first upper connector portion having a channel shape with a projecting wall and an elongate inclined wall extending upward from said projecting wall, a medial main portion, and a second lower connector portion also having a channel shape defined by an L-shaped projection having a substantially horizontal arm and an upstanding arm, said first and second connector portions being complementary in shape to enable interlocking with other panels of like construction such that at least a portion of said projecting wall of said upper connector portion abuts against said horizontal arm of said lower connector portion and a portion of said inclined wall abuts against said medial main portion, and at least one strip of high strength material is coextruded with at least one of the panel portions for rigidifying said panel.

2. A panel in accordance with claim 1 wherein said strip of high strength material is coextruded with one of the connector portions to be coincident with at least a portion of one of said channel shapes.

3. A panel in accordance with claim 2 wherein said strip of high strength material is located on a portion of the main portion of the panel.

4. A panel in accordance with claim 1 wherein said strip of high strength material is located on an outer surface of one of the connector portions.

5. A panel in accordance with claim 1 wherein said strip of high strength material is located on an inner surface of one of the connector portions.

6. A panel in accordance with claim 1 wherein said strip of high strength material is located on an outer surface and an inner surface of one of the connector portions.

7. A plastic siding panel comprising three regions including a first connector portion having a channel shape defined by an L-shaped projection having a substantially horizontal arm and an upstanding arm, a medial main portion and a second connector portion also having a channel shape with a projecting wall extending outward from said medial main portion and an elongate inclined wall extending upward from said projecting wall and inward toward said medial main portion, said first and second connector portions being complementary in shape to enable interlocking with other siding panels of like construction such that at least a portion of said projecting wall of said second connector portion abuts against said horizontal arm of said first connector portion and a portion of said inclined wall abuts against said medial main portion, all three regions of said siding panels being formed of a first material adapted for external use and a second material adapted for internal use, said first and second materials being fixed together to form two layers of the siding panel, and a third high strength material coextruded with at least one of said first and second materials for rigidifying said siding panel.

8. A siding panel in accordance with claim 7 wherein said third high strength material is formed as a discrete strip located along the length of one of said connector portions.

9. A siding panel in accordance with claim 8 wherein said third high strength material is further formed as a discrete strip located along the other of said connector portions.

10. A siding panel in accordance with claim 8 wherein said medial main portion includes a plurality of vertical well sections and at least one ledge, and wherein said third high strength material is further formed as a discrete strip located along said ledge.

11. A siding panel in accordance with claim 8 wherein said strip of high strength material is fixed to said first material.

12. A siding panel in accordance with claim 8 wherein said strip of high strength material is fixed to said second material.

13. A siding panel in accordance with claim 7 wherein said third high strength material is formed as a discrete strip fixed to each of said first and second materials along the length of one of said connector portions.

14. A siding panel in accordance with claim 7 wherein said medial main portion includes a plurality of vertical wall sections and at least one ledge, and wherein said third high strength material is formed as a discrete strip located along said ledge.

15. A siding panel in accordance with claim 7 wherein said L-shaped projection of said first connector portion defines an upwardly opening trough configuration with said main portion, wherein said second connector portion includes a pair of walls which extend transversely across the entire trough configuration of said first connector portion, and wherein said third high strength material is formed as a discrete strip located along the length of said pair of walls of said second connector portion.

16. A siding panel in accordance with claim 15 wherein said first and second materials are each a form of polyvinyl chloride.

17. A siding panel in accordance with claim 7 wherein said third high strength material is a reinforced polyvinyl chloride.

18. A method of forming a plastic siding panel comprising:

extruding a monolithic, substantially planar sheet composed of three difference materials, two of said materials being formed as layers extending over the entire sheet such that one of said two materials defines one side of said member and the other of said two materials defines the other side of said member, a third of said materials being a high strength material formed as at least one discrete strip covering a portion of at least one said two materials; and forming said planar member into a siding panel having a main portion, an upper connector portion having a channel shape with a projecting wall and an elongate inclined wall extending upward from said projecting wall and a lower portion also having a channel shape defined by an L-shaped projection having a substantially horizontal arm and an upstanding arm, said upper and lower connector portions being complimentary in shape to enable interlocking with other panels of like constructions such that at least a portion of said projecting wall of said upper connector portion abuts against said horizontal arm of said lower connector portion and a portion of said inclined wall abuts against said main portion.

19. A method of forming a siding panel in accordance with claim 18 wherein a strip of said high strength material is formed along at least one of said connector portions.

20. A method of forming a siding panel in accordance with claim 18 wherein a strip of said high strength material is formed along both of said connector portions.

21. A method of forming a siding panel in accordance with claim 18 wherein said monolithic sheet of three materials is tri-extruded from a single die head.

22. A method of forming a siding panel in accordance with claim 18 wherein said monolithic sheet of three materials is formed by initially co-extruding the two materials forming two layers of the entire sheet, and further extruding at least a strip of high strength material on at least one side of said sheet.

* * * * *